2 Sheets—Sheet 1.

G. DEAL.

Horse Rake.

No. 2,848.

Reissued Feb. 4, 1868.

Witnesses
E. J. Brown
D. Brewer

Inventor
George Deal,
By his Atty
J. W. Brown

N. PETERS, Photo-Lithographer, Washington, D. C.

2 Sheets—Sheet 2.

G. DEAL.

Horse Rake.

No. 2,848.

Reissued Feb. 4, 1868.

Inventor.
George Deal.
By his atty.
J. S. Brown

Witnesses
E. J. Brown
D. B. Venter

N. PETERS, Photo-Lithographer, Washington, D. C.

United States Patent Office.

GEORGE DEAL, OF WILMOT, OHIO.

*Letters Patent No.* 56,189, *dated July* 10, 1866; *reissue No.* 2,848, *dated February* 4, 1868.

IMPROVEMENT IN HORSE-RAKES.

The Schedule referred to in these Letters Patent and making part of the same.

TO ALL WHOM IT MAY CONCERN:

Be it known that I, GEORGE DEAL, of Wilmot, in the county of Stark, and State of Ohio, have invented an Improved Horse-Rake; and I do hereby declare that the following is a full and exact description thereof, reference being had to the accompanying drawings, making part of this specification—

Figure 1:
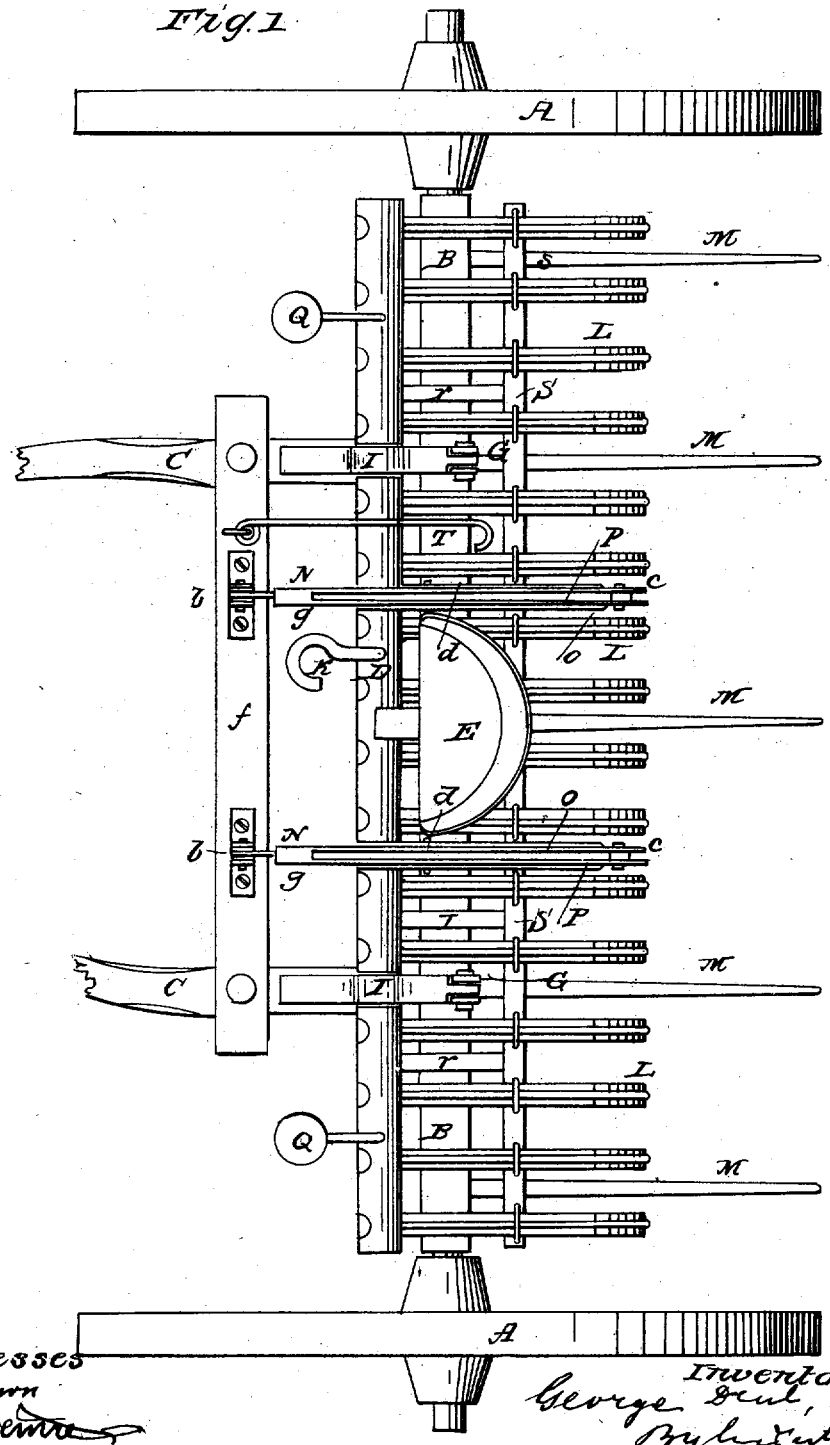
Figure 2:
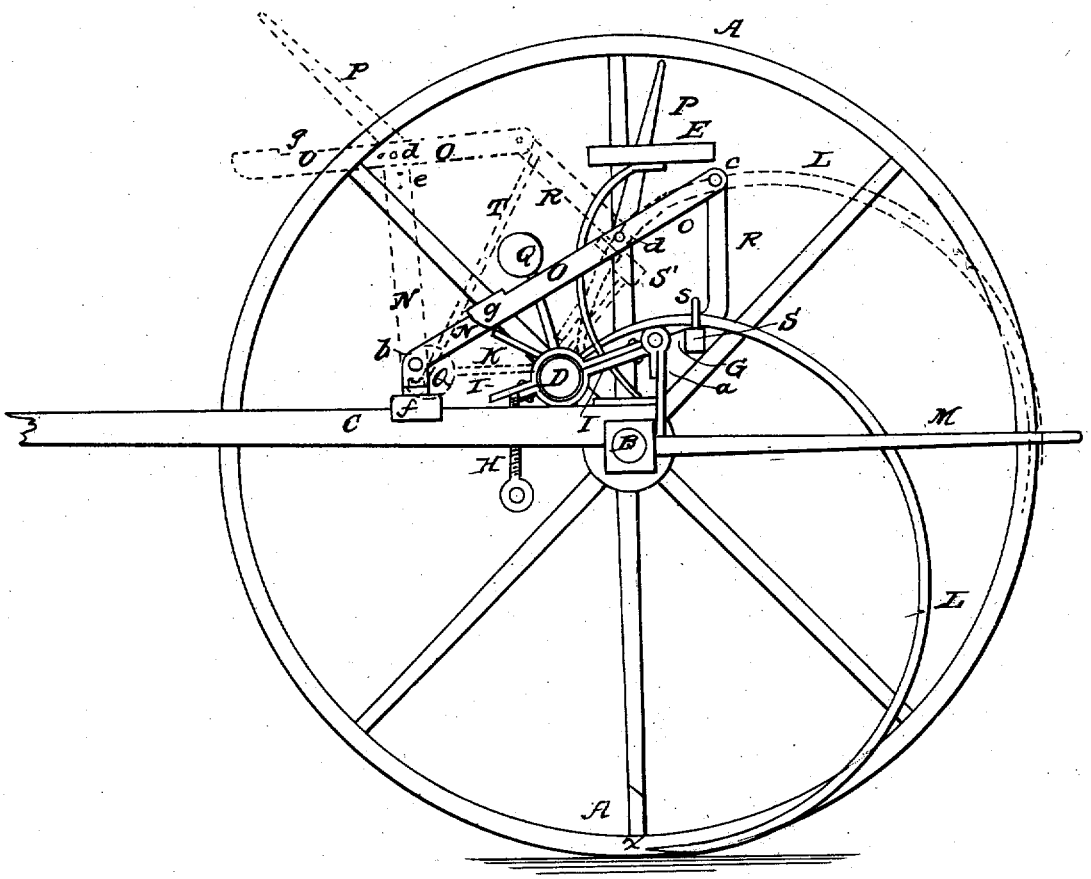

Figure 1 being a plan of the rake,

Figure 2 a side elevation thereof, the near wheel being removed to show the working parts more clearly.

Like letters designate corresponding parts in both figures.

The rake is supported by two wheels, A A, and their axle B, and is steadied and guided by thills C C, as usual with this class of rakes. The driver sits on a seat, E, to direct the horse and manage the rake.

The first feature of my invention consists in mounting the tooth-roller D on arms I I, which are hinged, at G, to supports *a a* over or upon the axle B, and extend forward therefrom, substantially as represented, so that I am enabled thereby to bring the points *x x* of the rake-teeth L L nearly or quite vertically under the axle or centre line of support. This arrangement causes the points of the rake-teeth to rise and lower with the wheels as they ascend over knolls, ridges, and obstructions, or sink into hollows and depressions, so that the teeth run about as closely and uniformly over uneven as even ground, without encountering obstructions. The forward ends of the hinged arms are adjusted up and down by set-screws H H, arranged as represented, or in any equivalent manner, for the purpose of raising and lowering the tooth-roller, and consequently the front ends of the teeth, as may be desired. The centre of motion on which this adjustment is made is in the line G G, situated nearly in a vertical position over the points of the teeth, so that the adjustment of the teeth does not throw them out of proper position. The front ends of the rake-teeth are bent upward around the tooth-roller D, or attached thereto in any suitable manner, and the said roller turns in its bearings in or on the hinged arms I I. Back of the centres G G of the arms I I, the teeth are all supported and lifted by a transverse bar, S, which may also be connected with the tooth-roller D by rods *r r*, fig. 1. The teeth are respectively secured in place on the bar S by staples or loops *s s*, which allow some play of the teeth separately, when they strike obstructions, while their elasticity ordinarily keeps them down in the proper position for action.

The second feature of my invention consists in an improved locking-device, to keep the lifting-bar S down, for holding the teeth in operating position. The general construction of this device is not essentially different from others heretofore used.

There are one or two pairs of arms, N O, N O; the arms N N being pivoted at *b b* to a cross-bar, *f*, attached to the thills C C, or to any fixed or firm part of the rake-support, and the arms O O being pivoted at *c c* to standards R R, projecting upward from the bar S, (or any equivalent attachment to said bar,) while the two pairs of arms are respectively pivoted together at *d d*. The arrangement of parts is such that, when the arms N O, N O are nearly or exactly in line with each other, the rake-teeth are held down in position, as indicated by black lines in fig. 2, but when the arms are bent forward, as indicated by red lines in the same figure, the teeth are raised from the ground, to release them from the gathered hay, or so as to allow the rake to be drawn from place to place. Ordinarily these arms are locked by bringing their pivot-connections *d d* a little below the direct line, beneath the pivot-points *b c*, and stopping their further descent by some arrangement; and, with devices heretofore invented, it is necessary to bring the pivot-centres *d d* below said lines, in order to secure the locking, since the resisting pressure of the teeth acts directly to force the arms upward, unless they fall below the "dead-point" lines. The same action causes the lock to bind forcibly, as soon as the arms fall below the "dead-points," so that it is hard to unlock them.

By my invention, the arms O O (which are represented as forked, or double, so as to embrace both sides of the arms N N) extend forward beyond the connecting-pivots *d d*, along the arms N N, well toward the forward ends thereof, substantially as represented, and have stops (or, if double, stirrup-connections) *g g*, to rest on the said arms N N, and permit each pair of arms N O to descend exactly in a line with each other, and no further. This position, exactly on the "dead-points," or all the pivot-centres *c d b* in a straight line, when the arms overlap, as described, locks the arms down, since the resisting pressure of the rake-teeth, lifting on the rear ends of the arms O O, as they turn upward around the tooth-roller D, the centre of which is situated further forward than the rear ends of the said arms O O, or so that the teeth make an acute angle with the arms, produces a depressing action on the forward ends thereof, around the pivots *d d*, thereby holding the arms N N down, without passing below the dead-point; and, on the other hand, the arms are unlocked readily, since there are no dead-points to lift them past. This overlapping of the arms also strengthens their connections, and prevents sagging. These arms are also self-locking by their weight. One (or, if desired, both) of the arms N N has a lever-handle, P, projecting upward, by which to actuate the arms. There are different pivot-holes, *e e*, in the arms N N, or O O, or both, for receiving the pivot-pins *d d*, in order to lengthen or shorten the distance between the cross-bar *f* and standards R R, and thus vary the height of the rake-teeth at pleasure. When the arms N O are bent, and the rake raised, they are held up by a hook, T, which is hinged to the cross-bar *f*, and hooks into or around one of the standards R R, as represented in fig. 2, or by any equivalent means. A pedal or foot-lever, K, may be attached to the tooth-roller D, for raising or holding up the teeth by the feet, if desired; and counter-weights, Q Q, may be secured on arms projecting forward from the tooth-roller, so as to partially balance the rake-teeth, and render them easy to raise.

What I claim as my invention, and desire to secure by Letters Patent, is—

The combination and arrangement of the hinged arms I I, adjusting-screws H H, or their equivalent, tooth-roller D, and rake-teeth L L, substantially as and for the purpose herein specified.

I also claim the locking-arms N O, overlapping as described, in combination with the rake, arranged in relation to said arms substantially as and for the purpose herein specified.

The above specification of my improved horse-rake signed by me, this 31st day of August, 1867.

GEORGE DEAL.

Witnesses:

J. H. HAMAKER,

WM. M. JOHNSTON.